(12) United States Patent
Yoshioka

(10) Patent No.: US 7,351,055 B2
(45) Date of Patent: Apr. 1, 2008

(54) INJECTION MOLDING MACHINE

(75) Inventor: Mitsushi Yoshioka, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 120 days.

(21) Appl. No.: 11/439,235

(22) Filed: May 24, 2006

(65) Prior Publication Data

US 2006/0269653 A1   Nov. 30, 2006

(30) Foreign Application Priority Data

May 25, 2005   (JP) .............................. 2005-152201

(51) Int. Cl.
*B29C 45/64*   (2006.01)
(52) U.S. Cl. ...................... 425/589; 425/595
(58) Field of Classification Search ................ 425/589, 425/595, 450.1, 451.9
See application file for complete search history.

(56) References Cited

U.S. PATENT DOCUMENTS 4,573,901 A * 3/1986 Hehl ........................ 425/450.1
5,356,279 A * 10/1994 Fuller et al. ................. 425/589

FOREIGN PATENT DOCUMENTS

| FR | 1570981 | 6/1969 |
|---|---|---|
| JP | 09-234765 | 9/1997 |
| JP | 2000-289069 | 10/2000 |
| JP | 2003-025378 | 1/2003 |
| WO | WO 03/055662 | 7/2003 |

OTHER PUBLICATIONS

European Search Report dated Sep. 11, 2006 for related European Patent Application No. 06 25 2586.

* cited by examiner

*Primary Examiner*—James P. Mackey
(74) *Attorney, Agent, or Firm*—Staas & Halsey LLP

(57) ABSTRACT

The invention provides an injection molding machine that prevents inclination of a stationary platen by a nozzle touch force. A groove is formed in a base along the axis of injection. Protrusions are provided on both lateral sides of the stationary platen. A bottom of the stationary platen is fixed on a bottom of the groove and bottoms of the protrusions are fixed on tops of ridged formed at opposite sides of the groove. A nozzle touch force applied by a nozzle provided on the front of a screw cylinder is applied against substantially the center portion of the stationary platen. A distance in the direction of height from the bottoms of the protrusions that fixedly mount the stationary platen on the base to the height position of the nozzle touch force is smaller than when the stationary platen is not fixedly mounted on the base using protrusions, and therefore the moment exerted by the nozzle touch force that attempts to incline the stationary platen is smaller than it would be otherwise, preventing the stationary platen from inclining.

17 Claims, 4 Drawing Sheets

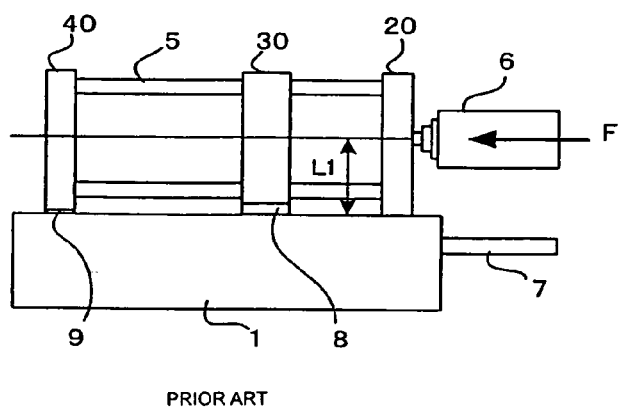
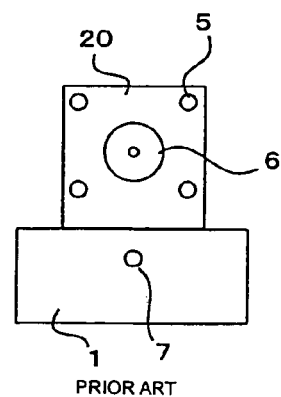
FIG.6a  FIG.6b
PRIOR ART
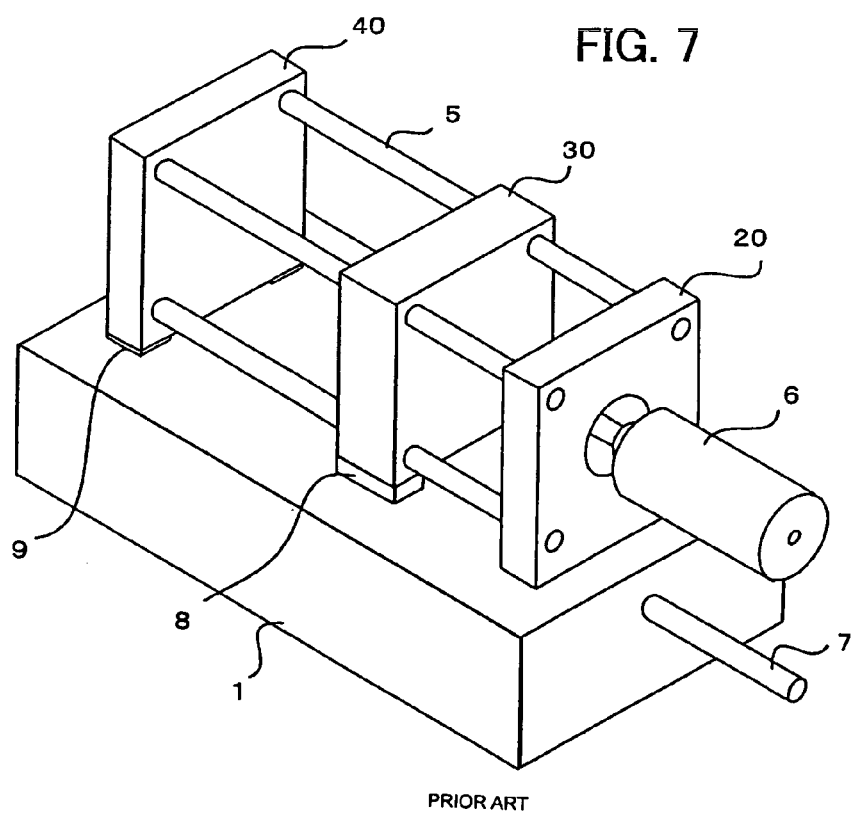
FIG. 7
PRIOR ART

INJECTION MOLDING MACHINE

BACKGROUND OF THE INVENTION

1. Field of the Invention

The present invention relates to an injection molding machine, and more particularly to an injection molding machine designed to prevent a stationary platen from inclining due to a nozzle touch force from an injection unit.

2. Description of the Related Art

FIGS. 6a, 6b and 7 are diagrams illustrating the conventional injection molding machine, and specifically a mold clamping mechanism thereof. FIG. 6a shows a front view of the injection molding machine, FIG. 6b shows a view from the right side as seen from the front in FIG. 6a, and FIG. 7 shows a perspective view.

A conventional mold clamping mechanism of the injection molding machine comprises a stationary platen 20 fixedly mounted along its bottom edge on a base 1 of the injection molding machine, a rear platen 40 set on the base 1 by rear platen support members 9, a plurality of (four) tie bars connecting the stationary platen 20 and the rear platen 40, a movable platen 30 set on the base 1 by a movable platen support member 8, and a drive mechanism, not shown, that moves the movable platen 30.

A stationary-side mold, not shown, is mounted on the stationary platen 20, a movable-side mold, not shown, is mounted on the movable platen 30, and the movable platen 30 is moved toward the stationary platen 20 by the drive mechanism to close the mold and then clamp it. In addition, an injection unit is disposed on the side of the stationary platen 20 away from the movable platen 30, the injection unit is advanced and a nozzle at the front of a screw cylinder 6 is pressed against a sprue bushing on the fixed-side mold, a nozzle touch force is applied, an injection screw is advanced and melted resin is injected into the clamped mold. It should be noted that, in FIGS. 6a, 6b and 7, reference numeral 7 indicates a nozzle touch drive shaft that advances the injection unit and touches the nozzle at the front of the screw cylinder 6 against the fixed mold.

The stationary platen 20 is fixedly mounted all along one edge (its bottom edge) on the base 1, against a central portion of which the nozzle touch from the screw cylinder 6 is applied. If, as shown in FIG. 6a, a height (length) from the bottom edge of the stationary platen 20 (where the stationary platen 20 is continuously fixedly mounted on the base 1) to the point at which the nozzle touch force acts is L1, and the nozzle touch force from the screw cylinder 6 is F, then a moment L1×F is applied to the stationary platen 20, which tends to cause the stationary platen 2 to tilt toward the movable platen 30 and incline. Consequently, to prevent this inclination a variety of countermeasures have been proposed.

Known stationary platen inclination countermeasures include providing a rib on the lower part of the nozzle touch side of the stationary platen and connecting a support provided on the base with the rib to prevent the stationary platen from inclining (JP 2000-289069A); providing extensions that project toward the injection unit side from both ends of the bottom of the stationary platen and fixedly mounting the extensions on the base to prevent the stationary platen from inclining (JP 2003-25378A); and providing multiple (two) nozzle drive units arranged symmetrically around the central axis of the injection nozzle and composed of rod-shaped moving screws, tubular fixed shafts the base end parts of which are fixed to a stationary platen, and fixing nuts combined with the screws, with the screws rotated to advance the injection nozzle against the stationary platen as the nozzle touch force is balanced to prevent inclination of the stationary platen (JP 09-234765A).

SUMMARY OF THE INVENTION

The present invention provides an injection molding machine capable of preventing inclination of the stationary platen due to the effect of nozzle touch force using inclination prevention means that are different from the conventional stationary platen inclination prevention means described above.

According to one aspect of the present invention, an injection molding machine comprises: a base; a mold clamping mechanism arranged on the base and including a stationary platen, a rear platen, tie bars connecting the stationary platen and the rear platen, and a movable platen arranged movable close to and apart from the stationary platen along the tie bars, so that a mold is clamped between the stationary platen and the movable platen; and an injection cylinder having a nozzle at an end thereof and arranged movable along an injection axis so that the nozzle is brought into contact with and pressed against a sprue of the mold clamped by the mold clamping mechanism in performing an injection operation, wherein the base has a groove along the injection axis to form ridges at opposite sides of the groove, and the stationary platen has a pair of protrusions on lateral sides thereof, a lower portion of the stationary platen under the protrusions is inserted into the groove, and bottom surfaces of the protrusions are fixed on top surfaces of the ridges.

A bottom surface of the stationary platen may be fixed on a bottom surface of the groove. Further, side surfaces of the stationary platen may be fixed on side surfaces of the groove.

According to another aspect of the present invention, an injection molding machine comprises: a base; a mold clamping mechanism arranged on the base and including a stationary platen, a rear platen, tie bars connecting the stationary platen and the rear platen, and a movable platen arranged movable close to and apart from the stationary platen along the tie bars, so that a mold is clamped between the stationary platen and the movable platen; and an injection cylinder having a nozzle at an end thereof and arranged movable along an injection axis so that the nozzle is brought into contact with and pressed against a sprue of the mold clamped by the mold clamping mechanism for performing an injection operation, wherein the base has a groove along the injection axis to form ridges on opposite sides of the groove, and a lower portion of the stationary platen is inserted into the groove, and side surfaces of the lower portion of the stationary platen are fixed to side surfaces of the groove. In this case also, a bottom surface of the stationary platen may be fixed on a bottom surface of the groove.

In the above structure of the injection molding machine, a bottom surface of the rear platen and a bottom surface of the movable platen may be in contact with a bottom surface of the groove directly or through support members.

Side surfaces of the rear platen and side surfaces of the movable platen may be in contact with side surfaces of the groove.

The rear platen may have a pair of protrusions on lateral sides thereof, and bottom surfaces of the protrusions may be in contact with top surfaces of the ridges directly or through support members.

The movable platen may have a pair of protrusions on lateral sides thereof, and bottom surfaces of the protrusions of the movable platen may be in contact with top surfaces of the ridges directly or through support members.

A depth of the groove may be substantially equal to or less than a distance between a bottom of the mold clamping mechanism and ones of the tie bars closest to the base.

A depth of the groove may be substantially equal to a distance between a bottom of the mold clamping mechanism and a position where the nozzle of the injection cylinder is brought into contact with the sprue of the mold.

With an injection molding machine having the structure described above, the moment exerted by the nozzle touch force that attempts to incline the stationary platen is smaller than it would be otherwise, preventing the stationary platen from inclining. In addition, the lower portions of the movable platen and the rear platen are inserted into the groove and movable in contact with the sides of the groove so as to keep the stationary platen, the movable platen and the rear platen parallel to each other.

BRIEF DESCRIPTION OF THE DRAWINGS

FIGS. 6a and 6b are diagrams showing front and side views illustrating the general structure of the mold clamping mechanism of the conventional injection molding machine; and FIG. 7 is a diagram showing a perspective view of the mold clamping mechanism of the conventional injection molding machine.

DETAILED DESCRIPTION

A detailed description will now be given of embodiments of the present invention, with reference to the accompanying drawings.

Figure 1A:
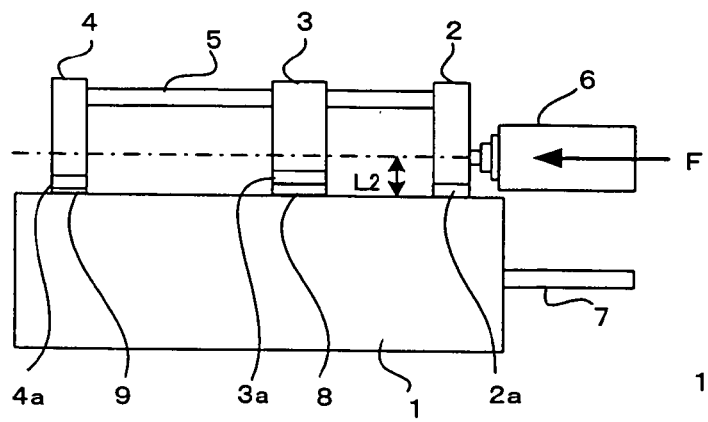
FIGS. 1a and 1b are diagrams showing front and side views illustrating the general structure of a first embodiment of the present invention.
Figure 1B:
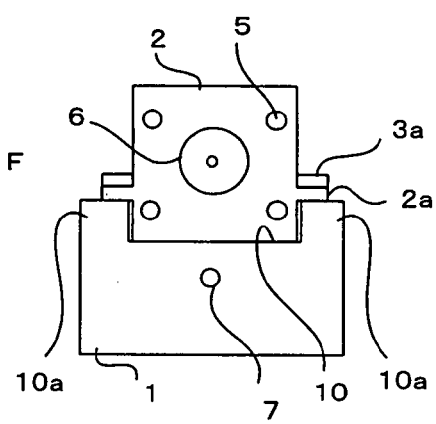
Figure 2:
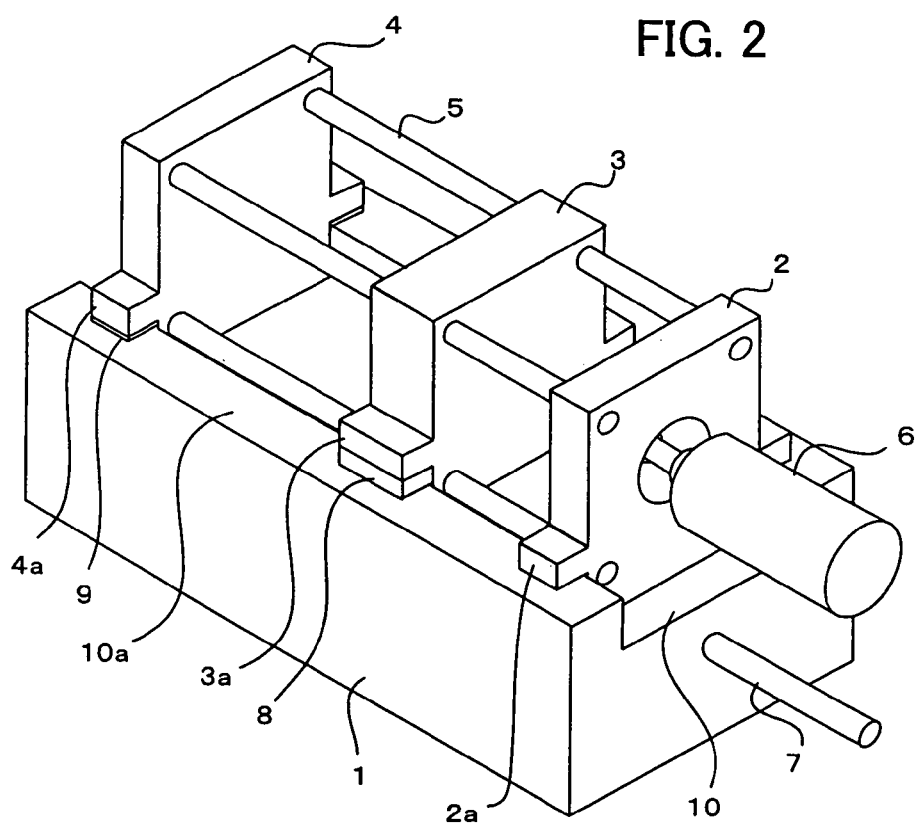
FIG. 2 is a diagram showing a perspective view of a mold clamping mechanism of the first embodiment.

FIGS. 1a, 1b and 2 are diagrams illustrating the general structure of an injection molding machine of a first embodiment of the present invention, focusing on a mold clamping mechanism thereof. FIG. 1a shows a front view, FIG. 1b is a side view as seen from the right in FIG. 1a, and FIG. 2 is a perspective view thereof. Elements in FIGS. 1a, 1b and 2 that are the same as those of the conventional injection molding machine shown in FIGS. 6a, 6b and 7 are given the same reference numerals and a description thereof omitted.

The difference between the first embodiment of the present invention and the conventional injection molding machine is that a recess or groove 10 is provided on the base 1 to form ridges at opposite sides of the groove and the mold clamping mechanism is placed on the groove 10 and the ridges.

As shown in FIGS. 1b and 2, the groove 10 is formed in the base 1 along an axis of injection. Protrusions 2a are provided on both lateral sides of the stationary platen 2. The stationary platen 2 is fixedly mounted on the bottom of the groove 10 of the stationary platen 2 and the bottoms of the pair of protrusions 2a are fixedly mounted on the tops of the ridges 10a.

Protrusions 4a are also provided on both lateral sides of a rear platen 4 coupled to the stationary platen 2 by multiple (four) tie bars 5, with the bottoms of the pair of protrusions 4a set on the tops of the ridges 10a by rear platen support members 9, and further, the bottom of the rear platen 4 is set on the bottom of the groove 10. In other words, the bottoms of the rear platen 4 and the protrusions 4a are set on the bottom of the base 1 and on the tops of the ridges 10a, respectively, and in this first embodiment the bottoms of the protrusions 4a rest on support members 9 set on the base 1. However, the bottom of the rear platen 4 also may rest on support members 9 and set on the bottom of the groove 10, and either or both the bottom of the rear platen 4 and the bottoms of the protrusions 4a may rest on support members 9 that rest on the base 1. Alternatively, the bottom of the rear platen 4 and the bottoms of the protrusions 4a may be set directly on the base 1 without providing support members 9.

In addition, protrusions 3a may also be provided on both lateral sides of a movable platen 3 disposed between the stationary platen 2 and the rear platen 4, and the movable platen 3 set on the bottom of the groove 10 and the bottoms of the pair of protrusions 3a set on the tops of the ridges 10a through movable-platen support members 8. It should be noted that in the case of the movable platen 3 as well, either or both the bottom of the movable platen 3 and the bottoms of the protrusions 3a may be placed indirectly on the base 1 by support members or both the movable platen 3 and the protrusions 3a may be placed directly on the base 1 without providing support members. It should be noted that, in FIGS. 1a, 1b and 2, the stationary platen 2, the movable platen 3, the rear platen 4 and the tie bars 5 of the mold clamping mechanism are shown but the drive mechanism that moves the movable platen 3 is omitted.

In the first embodiment, although the rear platen 4 and the movable platen 3, like the stationary platen 2, are also provided with protrusions 4a and 3a, respectively, it is not necessary that these protrusions 4a, 3a be provided. Thus, alternatively, the bottoms of the rear platen 4 and the movable platen 3 may be set directly on the bottom of the groove 10 or indirectly through support members, without providing protrusions 4a, 3a. Furthermore, where protrusions 4a, 3a are provided and the rear platen 4 and the movable platen 3 are supported on the base 1 by the protrusions 4a, 3a, it is not necessary to support the bottoms of the rear platen 4 and the movable platen 3 with the bottom of the groove 10.

In the first embodiment shown in FIGS. 1a, 1b and 2, the depth of the groove 10 is such as to accommodate the lower tie bars 5 (that is, the tie bars on the base 1 side), so that the tie bars 5 do not interfere with removal of the finished product from the mold. It should be noted that although the depth of the groove of the groove 10 is approximately the same as the height of the lower tie bars 5, alternatively the groove 10 may be of any depth that does not interfere with the removal of the finished product from the mold.

In FIGS. 1a, 1b and 2, reference numeral 6 indicates a screw cylinder of an injection unit and 7 indicates a nozzle touch drive shaft for moving the injection unit when pressing a nozzle provided on the front of the screw cylinder 6 against a sprue bushing on a mold mounted on the stationary platen 2 so as to seat the nozzle against the sprue bushing (nozzle touch).

The nozzle touch drive shaft 7 is driven to advance the injection unit, the nozzle mounted on the front of the screw cylinder 6 is contacted against the mold mounted on the stationary platen 2 and a nozzle touch force F is applied. In addition, the mold clamping mechanism is driven and the movable platen 3 advances along the tie bars 5, the molds mounted on the stationary platen 2 and the movable platen 3 are clamped together, the injection unit is driven, an injection screw is advanced, and metered and kneaded melted resin is injected into the mold. Thereafter the resin is pressurized, cooled, the movable platen 3 withdrawn, the mold opened and the finished product removed from the interior of the mold. This injection molding process is no different from the conventional injection molding process.

In this first embodiment of the present invention, even though the nozzle touch force F is applied against substantially the center of the stationary platen 2, since the stationary platen 2 is fixedly mounted on the base 1 by the protrusions 2a, if the height distance from the bottoms of the protrusions fixedly mounted on the base 1 to the position at which the nozzle touch force is exerted as shown in FIG. 1a, then the moment exerted in the stationary platen 2 is L2×F.

Compared to the conventional injection molding machine shown in FIGS. 6a, 6b and 7, the position at which the stationary platen 2 is fixedly mounted on the base 1 in the first embodiment is moved toward the nozzle touch force effect side by a distance equal to the depth of the groove 10, such that L2<L1. Accordingly, the moment exerted on the stationary platen 2 in the conventional injection molding machine that was L1×F becomes L2×F, in other words decreases (since L2×F<L1×F), and therefore tilt or inclination of the stationary platen 2 can be prevented.

Figure 3A:
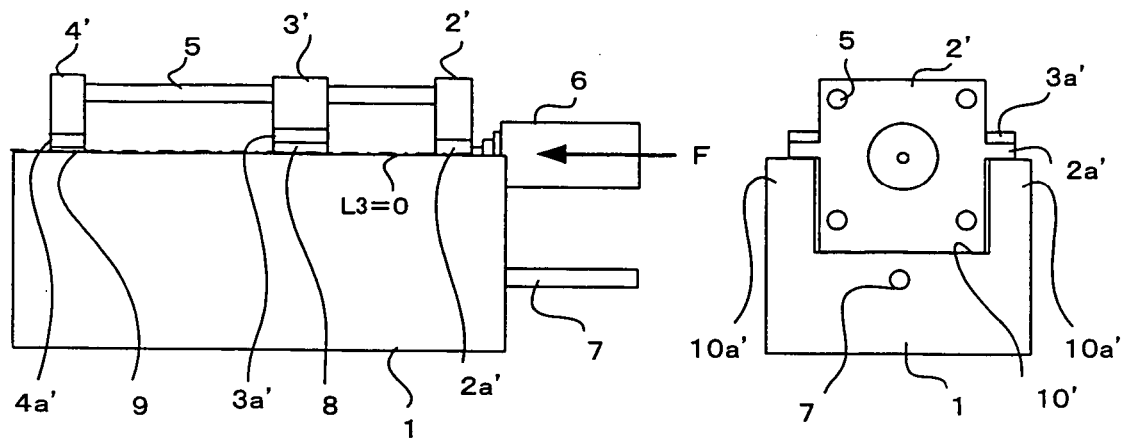
FIGS. 3a and 3b are diagrams showing front and side views illustrating the general structure of a second embodiment of the present invention.
Figure 3B:
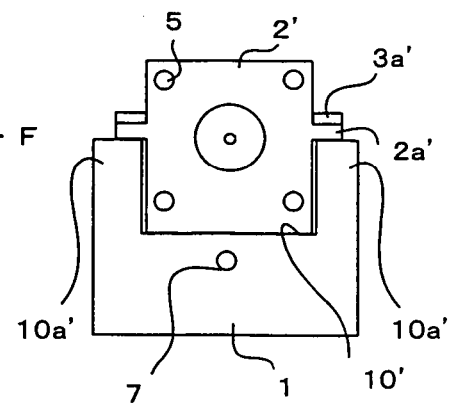
Figure 4:
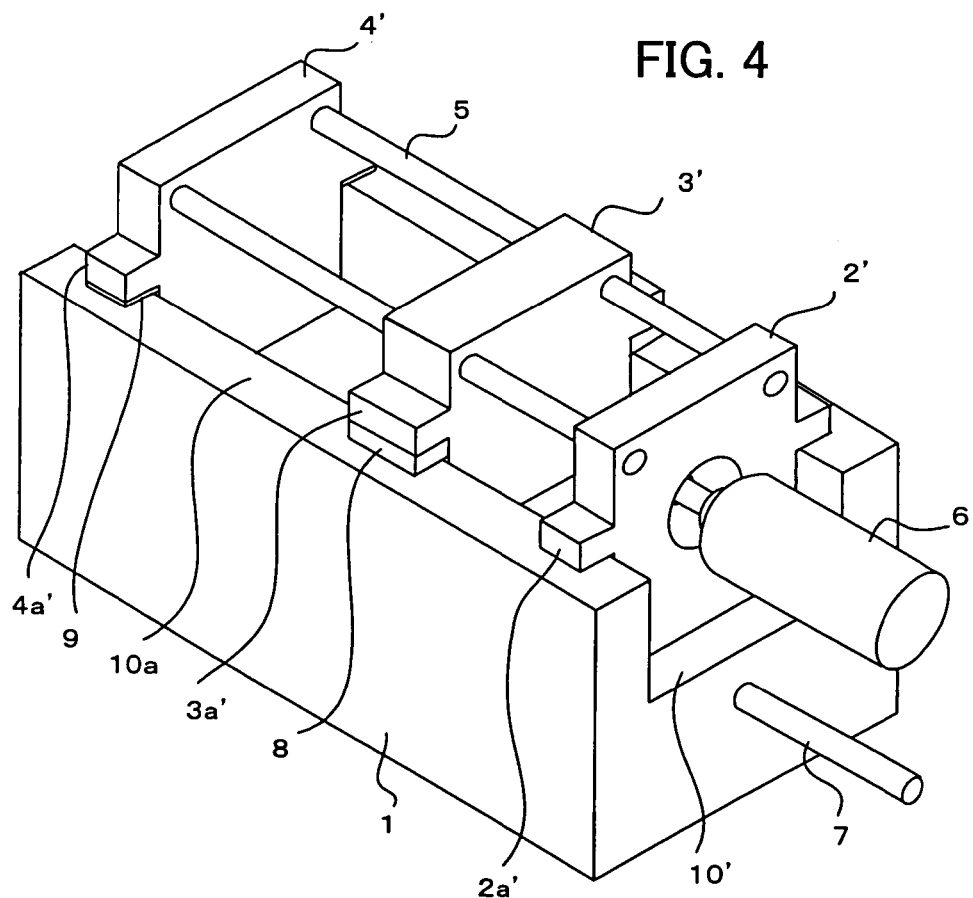
FIG. 4 is a diagram showing a perspective view of a mold clamping mechanism of the second embodiment.

FIGS. 3a, 3b and 4 are diagrams illustrating the general structure of an injection molding machine according to a second embodiment of the present invention. FIG. 3a shows a front view, FIG. 3b is a side view as seen from the right in FIG. 3a, and FIG. 4 is a perspective view thereof. Elements in FIGS. 1a, 1b and 2 that are the same as those of the conventional injection molding machine shown in FIGS. 6a, 6b and 7 are given the same reference numerals.

The only difference between the second embodiment of the present invention and the first embodiment shown in FIGS. 1a, 1b and 2 is that the depth of the groove 10 is increased.

In this second embodiment, a groove 10' is formed deep in the base 1. As shown in FIG. 3b, the surface of attachment between the bottoms of a pair of protrusions 2a' provided on both lateral sides of a stationary platen 2' and the tops of ridges 10a' is arranged at the same height as the position at which the nozzle provided at the front of the screw cylinder 6 contacts the mold mounted on the stationary platen 2'. The remainder of the structure of the second embodiment is identical to that of the first embodiment.

The bottom of the stationary platen 2' is fixedly mounted on the bottom of the groove 10' and the bottoms of the protrusions 2a' provided on both lateral sides of the stationary platen 2' are fixedly mounted on the tops of the ridges 10a'. Moreover, the bottom of a rear platen 4' also is set on the bottom of the groove 10', and the bottoms of a pair of protrusions 4a' are set on the tops of the ridges 10a' through support members 9.

In addition, a movable platen 3' also is set on the bottom of the groove 10' and the bottoms of a pair of protrusions 3a' are set on the tops of the ridges 10a' through support members 8.

It should be noted that, as with the first embodiment, in this second embodiment as well the bottoms of the rear platen 4' and the movable platen 3' may be set directly or through support members on the groove 10'. In addition, the pairs of protrusions 4a', 3a' of the rear platen 4' and the movable platen 3', respectively, may be set directly or through support members on the tops of the ridges 10a'. It should be noted that, in the second embodiment as well, the bottoms of the rear platen 4' and the movable platen 3' may simply be set directly or through support members on the bottom of the groove 10' without providing protrusions 4a', 3a' on the rear platen 4' and the movable platen 3a'. Moreover, if the rear platen 4' and the movable platen 3' are supported on the base 1 by protrusions 4a', 3a', it is not necessary to support the rear platen 4' and the movable platen 3' with the bottom of the groove 10'.

In the second embodiment, the position at which the protrusions 2a' of the stationary platen 2' are fixedly mounted on the base 1 is at the same height as the position at which the nozzle touch force F is applied to the stationary platen 2' from the nozzle of the screw cylinder 6, and thus the height distance L3 between the two is 0. Therefore, the moment exerted on the stationary platen 2 by the nozzle touch force F is L3×F=0×F=0, thereby eliminating any tilt or inclination of the stationary platen 2' due to the nozzle touch force F. However, in this second embodiment, the sides of the base 1 extend to the height of the center of the stationary platen 2', which hinders removal of the finished product from the mold. Accordingly, this second embodiment is suitable for types of injection molding machines in which the finished product is removed from above.

It should be noted that in the first and second embodiments described above the bottom of the stationary platen 2, 2' is fixedly mounted on the bottom of the groove 10, 10'. Alternatively, however, provided that the joints are of sufficient strength, only the bottoms of the protrusions 2a, 2a' may be fixedly mounted on the tops of the ridges 10a, 10a', without fixedly mounting the bottom of the stationary platen 2, 2' at the bottom of the groove 10, 10'.

In addition, together with fixedly mounting only the bottoms of the protrusions 2a, 2a' on the tops of the ridges 10a, 10a', the lateral sides of the stationary platen 2, 2' inserted into the groove 10, 10' below the protrusions 2a, 2a' may be fixedly mounted to the sides of the groove 10, 10'. For greater strength, the bottoms of the protrusions 2a, 2a' and the bottom and lateral sides of the stationary platen 2, 2' may be fixedly mounted on the tops of the ridges 10a, 10a', the bottom and the sides of the groove 10, 10', respectively.

In addition, the sides of the stationary platen 2, 2' inserted in the groove 10, 10' may be fixedly mounted on the sides of the groove 10, 10' without providing protrusions 2a, 2a' on the stationary platen 2, 2'. Further, fixedly mounting the bottom of the stationary platen 2, 2' mounted on the bottom of the groove 10, 10' so as to further strengthen the attachment of the stationary platen 2, 2' to the groove 10, 10' enables the same effects as with the first and second embodiments described above to be achieved.

Thus, as described above, the first and second embodiments reduce or eliminate the moment acting on the stationary platen by the nozzle touch force, thereby reducing or eliminating inclination of the stationary platen. These embodiments also further enable forward inclination of the movable platen to be improved, for the following reason. When the mold is mounted on the movable platen, the weight of the mold tends to tilt the movable platen forward. However with the first and second embodiments described above, the height at which the movable platen 3, 3' is supported on the base 1 by the protrusions 3a, 3a' approaches (or is the same as) the height of the center of the movable platen, which has the effect of reducing the influence of the weight of the mold on the movable platen 3, 3', enabling the present invention to provide an inexpensive, accurate mold clamping mechanism.

In addition, the lower parts of the rear platen 4, 4' and the movable platen 3, 3', which move attached to the groove 10, 10' by protrusions 4a, 4a' and 3a, 3a', respectively, and slide along the sides of the groove 10, 10' as they moving. Thus, the movement of the rear platen 4, 4' and the movable platen 3, 3' are guided by the sides of the groove 10, 10' so as to keep the stationary platen, the movable platen and the rear platen parallel to each other.

Figure 5:
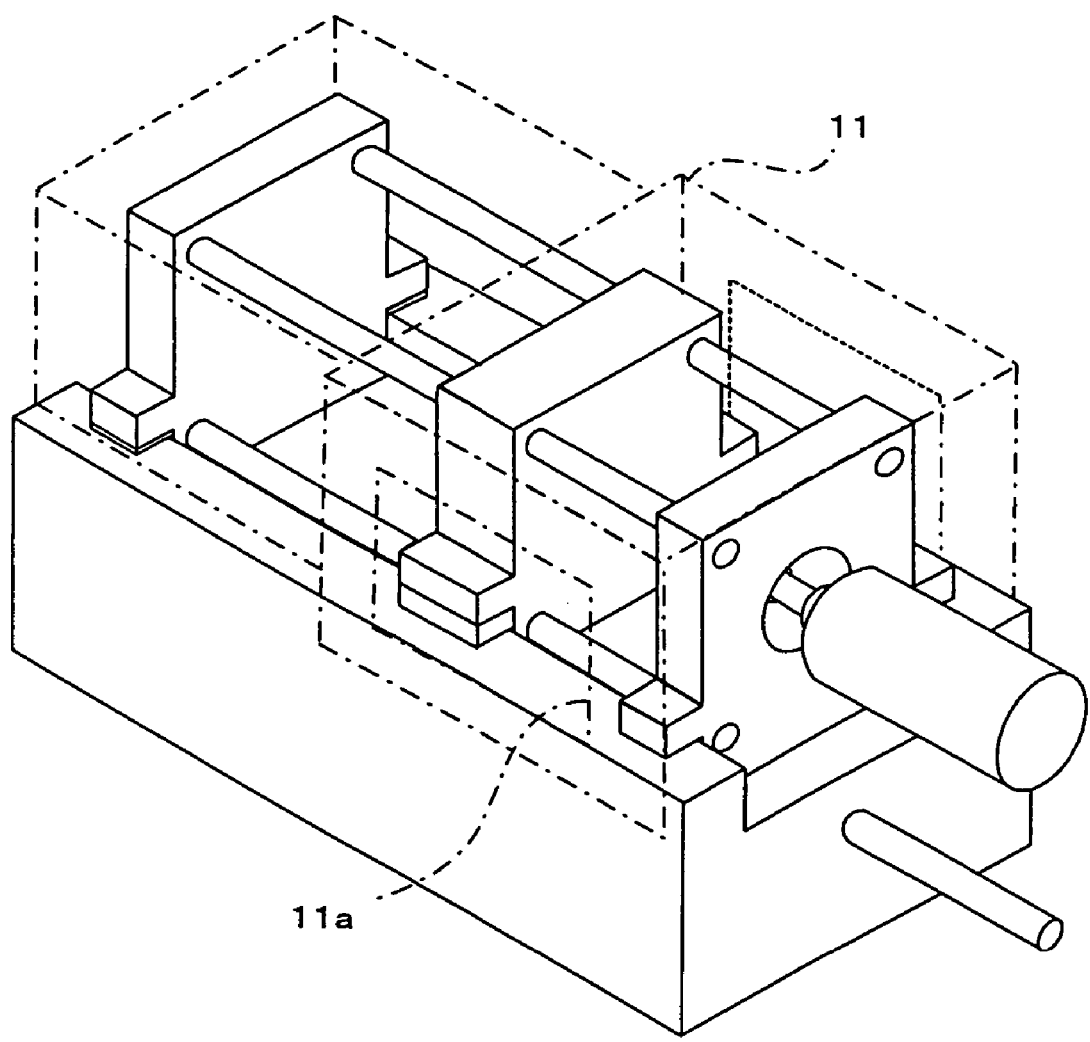
FIG. 5 is a diagram showing a perspective view of the first embodiment of the present invention with a cover provided on the mold clamping mechanism.

In addition, although not shown, a portion of the drive mechanism that moves the movable platen 3, 3' also can be disposed within the groove 10, 10', allowing a mold clamping mechanism safety cover like that indicated by the dashed-and-dotted line shown in FIG. 5 to be made more compact. It should be noted that FIG. 5 shows an example of a cover 11 is provided on the first embodiment of the present invention. In FIG. 5, reference numeral 11a indicates a port for the removal of the finished product.

What is claimed is:

1. An injection molding machine comprising:
    a base;
    a mold clamping mechanism arranged on said base and including a stationary platen, a rear platen, tie bars connecting said stationary platen and said rear platen, and a movable platen arranged movable close to and apart from said stationary platen along said tie bars, so that a mold is clamped between said stationary platen and said movable platen; and
    an injection cylinder having a nozzle at an end thereof and arranged movable along an injection axis so that the nozzle is brought into contact with and pressed against a sprue of the mold clamped by said mold clamping mechanism in performing an injection operation,
    wherein said base has a groove along the injection axis to form ridges at opposite sides of the groove, and said stationary platen has a pair of protrusions on lateral sides thereof, a lower portion of said stationary platen under the protrusions is inserted into the groove, and bottom surfaces of the protrusions are fixed on top surfaces of the ridges.

2. An injection molding machine according to claim 1, wherein a bottom surface of said stationary platen is fixed on a bottom surface of the groove.

3. An injection molding machine according to claim 1, wherein side surfaces of said stationary platen are fixed on side surfaces of the groove.

4. An injection molding machine according to claim 1, wherein a bottom surface of said rear platen and a bottom surface of said movable platen are in contact with a bottom surface of the groove directly or through support members.

5. An injection molding machine according to claim 1, wherein side surfaces of said rear platen and side surfaces of said movable platen are in contact with side surfaces of the groove.

6. An injection molding machine according to claim 1, wherein said rear platen has a pair of protrusions on lateral sides thereof, and bottom surfaces of the protrusions are in contact with the top surfaces of the ridges directly or through support members.

7. An injection molding machine according to claim 1, wherein said movable platen has a pair of protrusions on lateral sides thereof, and bottom surfaces of the protrusions of said movable platen are in contact with the top surfaces of the ridges directly or through support members.

8. An injection molding machine according to claim 1, wherein a depth of the groove is substantially equal to or less than a distance between a bottom of said mold clamping mechanism and ones of the tie bars closest to said base.

9. An injection molding machine according to claim 1, wherein a depth of the groove is substantially equal to a distance between a bottom of said mold clamping mechanism and a position where the nozzle of said injection cylinder is brought into contact with the sprue of the mold.

10. An injection molding machine comprising:
    a base;
    a mold clamping mechanism arranged on said base and including a stationary platen, a rear platen, tie bars connecting said stationary platen and said rear platen, and a movable platen arranged movable close to and apart from said stationary platen along said tie bars, so that a mold is clamped between said stationary platen and said movable platen; and
    an injection cylinder having a nozzle at an end thereof and arranged movable along an injection axis so that the nozzle is brought into contact with and pressed against a sprue of the mold clamped by said mold clamping mechanism for performing an injection operation,
    wherein said base has a groove along the injection axis to form ridges on opposite sides of the groove, and a lower portion of said stationary platen is inserted into the groove, and side surfaces of the lower portion of said stationary platen are fixed to side surfaces of the groove.

11. An injection molding machine according to claim 10, wherein a bottom surface of said stationary platen is fixed on a bottom surface of the groove.

12. An injection molding machine according to claim 10, wherein a bottom surface of said rear platen and a bottom surface of said movable platen are in contact with a bottom surface of the groove directly or through support members.

13. An injection molding machine according to claim 10, wherein side surfaces of said rear platen and side surfaces of said movable platen are in contact with side surfaces of the groove.

14. An injection molding machine according to claim 10, wherein said rear platen has a pair of protrusions on lateral sides thereof, and bottom surfaces of the protrusions are in contact with top surfaces of the ridges directly or through support members.

15. An injection molding machine according to claim 10, wherein said movable platen has a pair of protrusions on lateral sides thereof, and bottom surfaces of the protrusions of said movable platen are in contact with top surfaces of the ridges directly or through support members.

16. An injection molding machine according to claim 10, wherein a depth of the groove is substantially equal to or less than a distance between a bottom of said mold clamping mechanism and ones of the tie bars closest to said base.

17. An injection molding machine according to claim 10, wherein a depth of the groove is substantially equal to a distance between a bottom of said mold clamping mechanism and a position where the nozzle of said injection cylinder is brought into contact with the sprue of the mold.

* * * * *

UNITED STATES PATENT AND TRADEMARK OFFICE
CERTIFICATE OF CORRECTION

PATENT NO. : 7,351,055 B2  Page 1 of 1
APPLICATION NO. : 11/439235
DATED : April 1, 2008
INVENTOR(S) : Mitsushi Yoshioka It is certified that error appears in the above-identified patent and that said Letters Patent is hereby corrected as shown below:

Column 7, Line 6, after "move" insert --reciprocally, are--.

Signed and Sealed this

Twelfth Day of August, 2008

JON W. DUDAS
*Director of the United States Patent and Trademark Office*